United States Patent [19]
Hashimoto

[11] 4,327,168
[45] Apr. 27, 1982

[54] ELECTROPHOTOGRAPHIC ELEMENT CONTAINING DISAZO PIGMENT CHARGE GENERATING MATERIAL

[75] Inventor: Mitsuru Hashimoto, Numazu, Japan

[73] Assignee: Ricoh Co., Ltd., Tokyo, Japan

[21] Appl. No.: 217,305

[22] Filed: Dec. 17, 1980

[30] Foreign Application Priority Data

Dec. 28, 1979 [JP] Japan .................................. 54-170458

[51] Int. Cl.$^3$ ............................................ G03G 5/06
[52] U.S. Cl. ......................................... 430/57; 430/72;
430/135; 430/58; 260/152; 260/156; 260/193
[58] Field of Search ........................ 430/71, 72, 73, 58,
430/135; 260/156, 152, 193

[56] References Cited

U.S. PATENT DOCUMENTS 4,242,260 12/1980 Sasaki et al. ..................... 430/73 X
4,260,672 4/1981 Sasaki et al. ..................... 430/58 X

*Primary Examiner*—John D. Welsh
*Attorney, Agent, or Firm*—Blanchard, Flynn, Thiel, Boutell & Tanis

[57] ABSTRACT

An electrophotographic element comprising an electrically conductive support and a mono-layer or multi-layer type photosensitive layer, superposed thereon, containing as an active ingredient a disazo pigment having the following general formula:

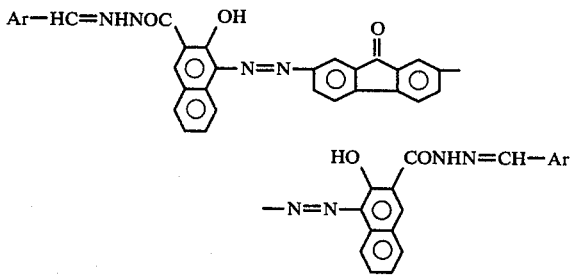

where Ar is a substituted or non-substituted phenyl, substituted or non-substituted naphthyl, anthryl, pyrenyl, pyridyl, thienyl, furyl or carbazolyl group.

12 Claims, 5 Drawing Figures

ELECTROPHOTOGRAPHIC ELEMENT CONTAINING DISAZO PIGMENT CHARGE GENERATING MATERIAL

BACKGROUND OF THE INVENTION

1. Field of the Invention

This invention relates in general to an electrophotographic element, and in particular to a novel electrophotographic element having a photosensitive layer containing a disazo as an pigment active ingredient.

2. Description of the Prior Art

As electrophotographic elements of such a type that comprises an electrically conductive support and a photosensitive layer, superposed thereon, containing an azo pigment as an active ingredient, there have hitherto been known, for instance, the electrophotographic element using a monoazo pigment (Japanese Patent Publication No. 16474/1969), or using a benzidine type disazo pigment (Japanese Laid-open Patent Application No. 37543/1972) and so forth. It is admitted that these azo pigments are, as above mentioned, serviceable as the active ingredient for the photosensitive layer. In spite of this, the fact is that no azo pigment has yet been obtained which can fully satisfy various demands of electrophotographic processes. Taking this fact into consideration, therefore, it is desirable to extend the range of pigments so that one may select pigments operable as active ingredients from within a wide range without being restricted only to azo pigments. Otherwise, it will not be possible to provide an electrophotographic element which is substantially suitable for a certain process. In other words, it is preferable in the electrophotographic process that the pigments operable as active ingredients are of as many different kinds as possible.

SUMMARY OF THE INVENTION

The first object of this invention is to provide an electrophotographic element containing a novel disazo pigment which is operable as an active ingredient in various kinds of electrophotographic processes.

The second object of this invention is to provide an electrophotographic element which permits a wide range of choice of disazo pigments operable as active ingredients.

The third object of this invention is to provide a highly sensitive, as well as flexible, electrophotographic element containing a disazo pigment as aforesaid.

We have prepared a group of disazo pigments and investigated their applicability to an electrophotographic element and have discovered that a fluorenone skeleton type disazo pigment having the following general formula can exhibit an extremely excellent performance as an active ingredient in an electrophotographic element. This invention has been completed on the basis of this discovery.

In other words, the electrophotographic element according to this invention is characterized by the provision of an electrically conductive support and a mono-layer or multi-layer type photosensitive layer, superposed thereon, containing as an active ingredient a disazo pigment having the following general formula:

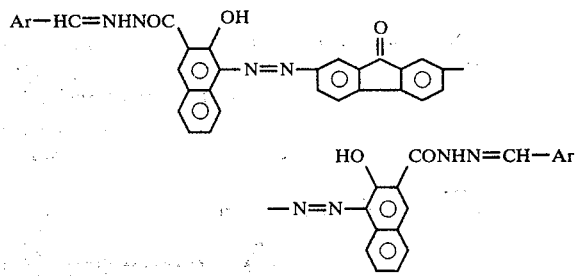

(where Ar is a substituted or non-substituted phenyl, substituted or non-substituted naphthyl, anthryl, pyrenyl, pyridyl, thienyl, furyl or carbazolyl group.)

In this context, it is to be noted that as the substitution groups for Ar referred to in the above mentioned general formula there can be enumerated $OCH_3$, Cl, Br, OH, $NO_2$, $CH_3$, $OC_2H_5$, $C_2H_5$, $N(CH_3)_2$, $N(C_2H_5)_2$,

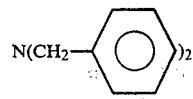

and the like.

The compounds having the above mentioned general formula, suitably employed for this invention, will be represented hereinafter by concrete structural formulas. In this connection, it is to be noted that the portion

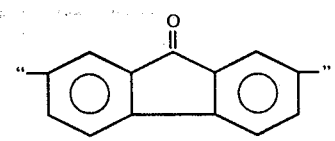

in the above mentioned general formula will be shown as "—Y—".

| Structural Formula | Compound No. |
|---|---|
| 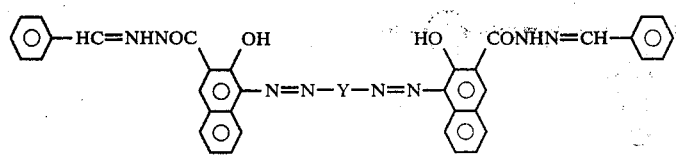 | 1 |

-continued

| Structural Formula | Compound No. |
|---|---|
| H₃CO-C₆H₄-HC=NHNOC-(naphthalene-OH)-N=N-Y-N=N-(naphthalene-OH)-CONHN=CH-C₆H₄-OCH₃ (ortho) | 2 |
| H₃CO-C₆H₄-HC=NHNOC-(naphthalene-OH)-N=N-Y-N=N-(naphthalene-OH)-CONHN=CH-C₆H₄-OCH₃ (meta) | 3 |
| H₃CO-C₆H₄-HC=NHNOC-(naphthalene-OH)-N=N-Y-N=N-(naphthalene-OH)-CONHN=CH-C₆H₄-OCH₃ (para) | 4 |
| Cl-C₆H₄-HC=NHNOC-(naphthalene-OH)-N=N-Y-N=N-(naphthalene-OH)-CONHN=CH-C₆H₄-Cl (ortho) | 5 |
| Cl-C₆H₄-HC=NHNOC-(naphthalene-OH)-N=N-Y-N=N-(naphthalene-OH)-CONHN=CH-C₆H₄-Cl (meta) | 6 |
| Cl-C₆H₄-HC=NHNOC-(naphthalene-OH)-N=N-Y-N=N-(naphthalene-OH)-CONHN=CH-C₆H₄-Cl (para) | 7 |
| Br-C₆H₄-HC=NHNOC-(naphthalene-OH)-N=N-Y-N=N-(naphthalene-OH)-CONHN=CH-C₆H₄-Br (ortho) | 8 |
| Br-C₆H₄-HC=NHNOC-(naphthalene-OH)-N=N-Y-N=N-(naphthalene-OH)-CONHN=CH-C₆H₄-Br (meta) | 9 |
| Br-C₆H₄-HC=NHNOC-(naphthalene-OH)-N=N-Y-N=N-(naphthalene-OH)-CONHN=CH-C₆H₄-Br (para) | 10 |

-continued

| Structural Formula | Compound No. |
|---|---|
| (bis-azo naphthol compound with 2-hydroxyphenyl-CH=NHNOC end groups) | 11 |
| (bis-azo naphthol compound with 3-hydroxyphenyl-CH=NHNOC end groups) | 12 |
| (bis-azo naphthol compound with 4-hydroxyphenyl-CH=NHNOC end groups) | 13 |
| (bis-azo naphthol compound with 2-nitrophenyl-CH=NHNOC end groups) | 14 |
| (bis-azo naphthol compound with 3-nitrophenyl-CH=NHNOC end groups) | 15 |
| (bis-azo naphthol compound with 4-nitrophenyl-CH=NHNOC end groups) | 16 |
| (bis-azo naphthol compound with 2-methylphenyl-CH=NHNOC end groups) | 17 |
| (bis-azo naphthol compound with 3-methylphenyl-CH=NHNOC end groups) | 18 |
| (bis-azo naphthol compound with 4-methylphenyl-CH=NHNOC end groups) | 19 |

-continued

| Structural Formula | Compound No. |
|---|---|
| (structure with H5C2O-phenyl-HC=NHNOC / naphthalene-OH / N=N-Y-N=N / naphthalene-OH / CONHN=CH-phenyl-OC2H5) | 20 |
| (structure with H5C2O-phenyl-HC=NHNOC / naphthalene-OH / N=N-Y-N=N / naphthalene-OH / CONHN=CH-phenyl-OC2H5, para) | 21 |
| (structure with H5C2-phenyl-HC=NHNOC / naphthalene-OH / N=N-Y-N=N / naphthalene-OH / CONHN=CH-phenyl-C2H5) | 22 |
| (structure with (H3C)2N-phenyl-HC=NHNOC / naphthalene-OH / N=N-Y-N=N / naphthalene-OH / CONHN=CH-phenyl-N(CH3)2) | 23 |
| (structure with (H5C2)2N-phenyl-HC=NHNOC / naphthalene-OH / N=N-Y-N=N / naphthalene-OH / CONHN=CH-phenyl-N(C2H5)2) | 24 |
| (structure with (PhCH2)2N-phenyl-HC=NHNOC / naphthalene-OH / N=N-Y-N=N / naphthalene-OH / CONHN=CH-phenyl-N(CH2Ph)2) | 25 |
| (structure with 3,4-dimethylphenyl-HC=NHNOC / naphthalene-OH / N=N-Y-N=N / naphthalene-OH / CONHN=CH-3,4-dimethylphenyl) | 26 |
| (structure with 2,5-dimethylphenyl-HC=NHNOC / naphthalene-OH / N=N-Y-N=N / naphthalene-OH / CONHN=CH-2,5-dimethylphenyl) | 27 |
| (structure with 2,3-dimethoxyphenyl-HC=NHNOC / naphthalene-OH / N=N-Y-N=N / naphthalene-OH / CONHN=CH-2,3-dimethoxyphenyl) | 28 |

| Structural Formula | Compound No. |
|---|---|

Compound 29, 30, 31, 32, 33, 34, 35, 36, 37: bis-azo naphthalene compounds of the general form Ar–HC=NHNOC–(naphthol)–N=N–Y–N=N–(naphthol)–CONHN=CH–Ar, where Ar varies:

- 29: Ar = 3,4-dimethoxyphenyl (OCH₃ at 3,4 positions; H₃CO and OCH₃)
- 30: Ar = 2,4-dimethoxyphenyl (H₃CO at 4, OCH₃ at 2)
- 31: Ar = 3,4-dimethoxyphenyl (H₃CO, H₃CO–)
- 32: Ar = 3,5-dimethoxyphenyl (H₃CO and H₃CO at 3,5)
- 33: Ar = 3,4,5-trimethoxyphenyl (H₃CO, OCH₃, H₃CO)
- 34: Ar = 3,4,5-trimethoxyphenyl (H₃CO, H₃CO, H₃CO)
- 35: Ar = naphthyl
- 36: Ar = naphthyl (2-naphthyl)
- 37: Ar = methoxynaphthyl (H₃CO–naphthyl)

| Structural Formula | Compound No. |
|---|---|
| (structure) | 38 |
| (structure) | 39 |
| (structure) | 40 |
| (structure) | 41 |
| (structure) | 42 |
| (structure) | 43 |
| (structure) | 44 |
| (structure) | 45 |
| (structure) | 46 |

Among these disazo pigments, Nos. 1, 35, 39 and 46 compounds are preferred.

The disazo pigments according to this invention can be prepared readily by coupling the 9-fluorenone-2,7-bisdiazonium bistetrafluoroborate referred to in Japanese Laid-Open Patent Application No. 22834/1979 with couplers corresponding to the respective pigments in a suitable organic solvent, for instance, such as N,N-dimethylformamide (DMF) in the presence of alkali.

These couplers used herein can be prepared readily by heating 2-hydroxy-3-naphthoic acid hydrazide and aldehyde in organic solvents, for instance, such as alcohol and the like in accordance with the method taught by Franzen et al. (J. Prak. Chem. [2] 78, 164).

One preparation example of the disazo pigment will be given hereinafter.

PREPARATION EXAMPLE 2.04 g of 9-fluorenone-2,7-bisdiazonium bistetrafluoroborate and 2.90 g of 2-hydroxy-3-naphthoic acid benzalhydrazide were dissolved in 300 ml of DMF. A solution comprising 1.64 g of sodium acetate and 14 ml of water was dropped in the above mentioned solution at room temperature. After dropping was completed, the resulting solution was stirred at the same temperature for 2 hours, and the thus separated crystals were filtered. 300 ml of DMF was added to the residue and the resulting mixture was stirred at 80° C. for 2 hours. Thereafter, the separated crystals were filtered again. This operation was repeated twice. The recovered crystals were washed with water and dried, whereby 3.20 g of disazo pigment Compound No. 1 were obtained in the form of blue-black crystals.

|     | Elementary analysis | |
| --- | --- | --- |
|     | Calculated value | Measured value |
| C % | 72.40 | 72.20 |
| H % | 3.97 | 3.89 |
| N % | 13.79 | 13.51 |

Infrared absorption spectrum (KBr/disk) is shown in FIG. 5.

Vco (secondary amide): 1680 cm$^{-1}$
Vco (fluorenone): 1726 cm$^{-1}$

The electrophotographic elements according to this invention, which include the above defined disazo pigments, can take the forms as illustrated in FIGS. 1 to 4 depending upon how these pigments are applied.

Figure 1:
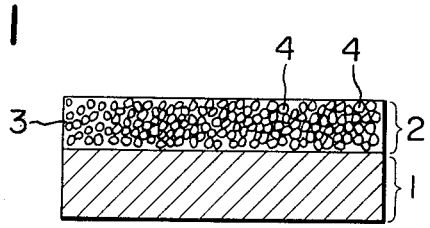
FIGS. 1 to 4 are enlarged cross-sectional views of embodiments of each of the elements according to this invention.
Figure 2:
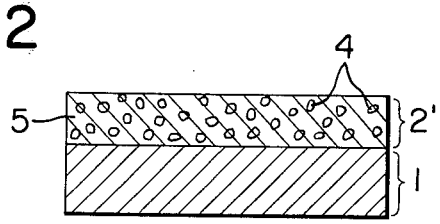
Figure 3:
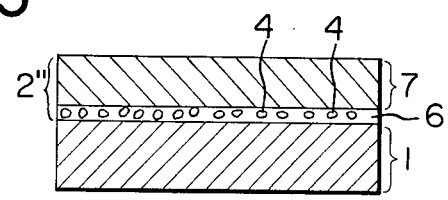
Figure 4:
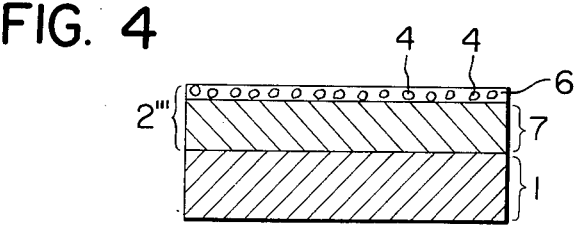
Figure 5:
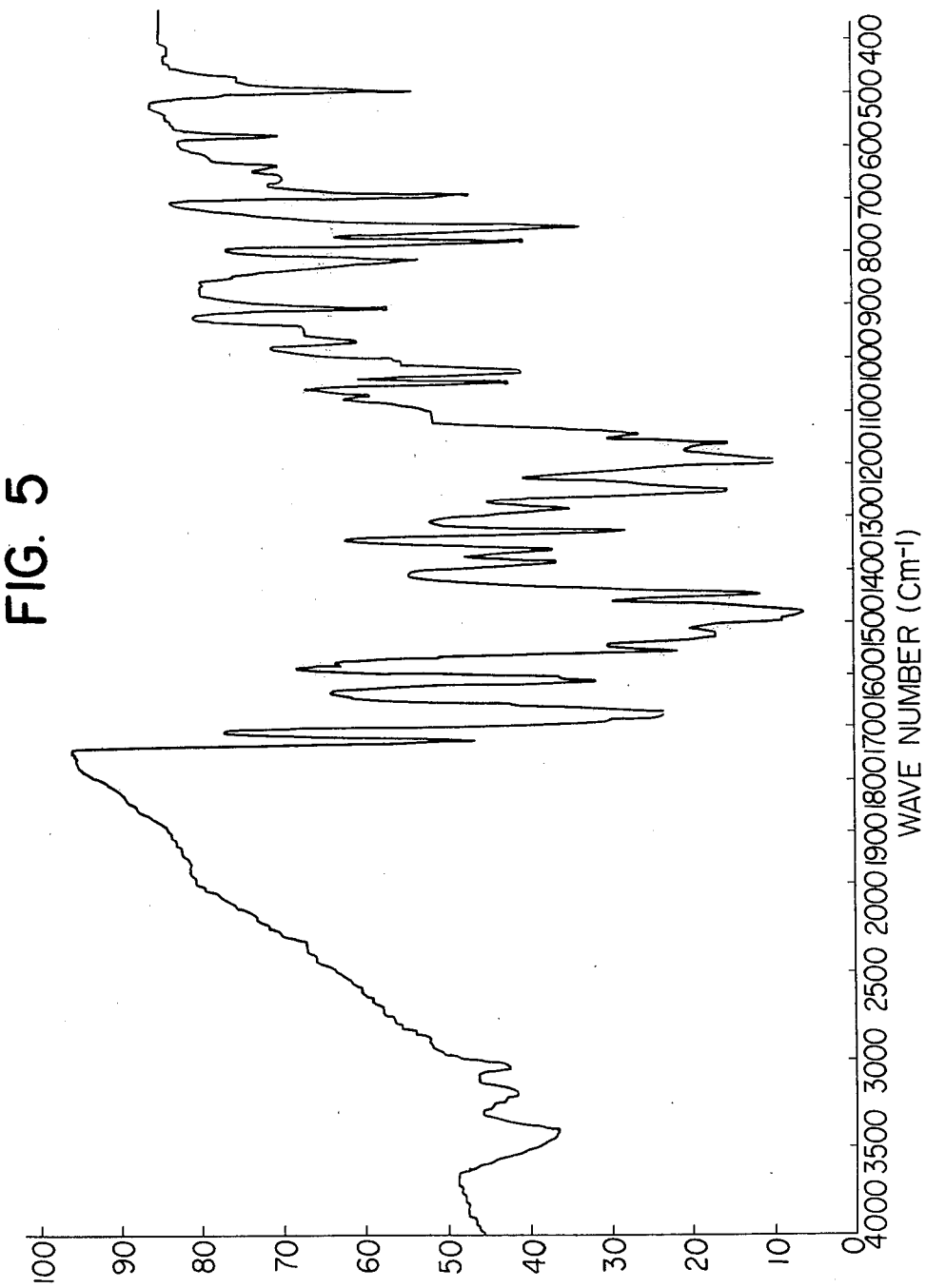
FIG. 5 is the infrared absorption spectrum of the disazo pigment No. 1.

The electrophotographic element illustrated in FIG. 1 comprises an electrically conductive support 1 and a photosensitive layer 2 comprising a disazo pigment 4 (which is employed herein as a photoconductive material) and a resinous binder 3 superposed on said support. The electrophotographic element illustrated in FIG. 2 comprises an electrically conductive support 1 and a photosensitive layer 2' comprising a disazo pigment 4 (which is employed herein as a charge generation material) and a charge transfer medium 5 (a mixture of charge transfer material and resinous binder) superposed on said support. The electrophotographic element illustrated in FIGS. 3 to 4 are modifications of the element of FIG. 2, wherein the photosensitive layers 2", 2''' comprise a charge generation layer 6 consisting essentially of the disazo pigment 4 and a charge transfer medium layer 7 respectively.

The respective ingredients constituting these electrophotographic elements will exhibit the following properties to obtain good results.

In the electrophotographic element of FIG. 1, the disazo pigment functions as a photoconductive material and therefore the generation and transfer of charge-carriers required for light decay is effected through the disazo pigment. In the case of the electrophotographic element of FIG. 2, the charge transfer material forms a charge transfer media in conjunction with a binder (and a plasticizer as occasion demands), while the disazo pigment functions as a charge generation material. In this case, the charge transfer media does not have a charge-carrier generation ability as the disazo pigment does, but is able to accept charge-carriers that the disazo pigment generates and to transfer said charge-carriers. In the electrophotographic element of FIG. 2, in other words, the generation of charge-carriers required for light decay is attained by the disazo pigment, while the transfer of charge-carriers is achieved mainly by the charge transfer medium. What is fundamentally required for the charge transfer medium in this instance is that the absorption wave length region of the charge transfer media should not overlap the absorption wave length region of the disazo pigment mainly in the visible light region. This is because it is necessary to permit light to be transmitted to the surface of the disazo pigment so that the latter may generate charge-carriers efficiently. However, this is not applicable to an element which is sensitive only to a specific wave length. In such a case it is to be noted that overlapping absorption ranges can be sufficient unless both the charge transfer medium and the disazo pigment overlap completely in the wave lengths absorbed. Next, in the case of the electrophotographic element illustrated in FIG. 3, the light transmitted through the charge transfer media layer 7 reaches the charge generation layer 6 and thereby generates charge-carriers at the portions of the disazo pigment struck by light, while the thus-generated charge-carriers are injected in the charge transfer medium layer and transferred therethrough. The mechanism employed herein, where the generation of charge-carriers required for light decay is allotted to the disazo pigment, while the transfer of charges is allotted to the charge transfer medium, is the same as that employed in the electrophotographic element illustrated in FIG. 2. The disazo pigment functions as the charge generation material in the case of FIG. 2 as well. In this connection, it is to be noted that the electrophotographic element illustrated in FIG. 4 is identical with that illustrated in FIG. 3 in respect of the function and mechanism of both the charge transfer layer and the charge generation layer.

The electrophotographic element illustrated in FIG. 1 may be prepared by coating a dispersion onto an electrically conductive support and drying it wherein, said dispersion is obtained by dispersing fine particles of disazo pigment in a binder solution. The electrophotographic element illustrated in FIG. 2 may be prepared by coating a dispersion onto an electrically conductive support and drying it wherein, said dispersion is obtained by dispersing fine particles of disazo pigment in a solution in which a charge transfer material and a binder are dissolved. The electrophotographic element illustrated in FIG. 3 may be prepared by vacuum-evaporating a disazo pigment onto an electrically conductive support or, if needed, coating onto an electrically conductive support a dispersion obtained by dispersing fine particles of a disazo pigment in a suitable solvent dissolving a binder therein, and drying. If further needed, such an element can be prepared by coating a solution containing a charge transfer material and a binder onto an electrically conductive layer after surface finishing or film thickness regulation by, for instance, buffing or the like, and drying. In the case of the electrophotographic element illustrated in FIG. 4, such an element may be prepared by inverting the film forming sequence employed in the preparation of the electrophotographic element of FIG. 3. In any case, the disazo pigment, when employed in this invention, should be pulverized by means of a ball mill or the like into particles having a diameter of about 5 microns or less, preferably about 2 microns or less. The coating method used herein includes the usual means, such as a doctor blade, wire bar or the like. The photosensitive layers of the electrophotographic elements illustrated in FIGS. 1 and 2 are each between about 3 microns and 50 microns thick, preferably between about 5 microns and 20 microns thick. In the case of the electrophotographic elements illustrated in FIGS. 3 and 4, the charge generation layer 6 is between about 0.01 micron and 5 microns thick, preferably 2 microns or less, and the charge transfer medium layer 7 is between about 3 microns and 50 microns thick, preferably between about 5 microns and 20 microns. In the case of the electrophotographic element illustrated in FIG. 1, the amount of the disazo pigment contained in the photosensitive layer is in the range of from about 30 to 70% by weight, preferably about 50% by weight relative to the photosensitive layer. In the case of the electrophotographic element illustrated in FIG. 1, as mentioned above, since the disazo pigment acts as the photoconductive material and the generation and transfer of the charge-carriers required for light decay are effected through pigment particles, it is preferable that the contact between pigment particles extends from the surface of the photosensitive layer to the support. To this end, it is preferable that the percentage of the pigment contained in the photosensitive layer be relatively greater, but, taking the strength and sensitivity of the photosensitive layer into account, the preferable percentage is about 50% by weight. In the electrophotographic element illustrated in FIG. 2, the percentage of the disazo pigment in the photosensitive layer is in the range of from about 0.1 to 50% by weight, preferably 20% by weight or less, and the percentage of the charge transfer material in the photosensitive layer is in the range of from 10 to 95% by weight, preferably from 30 to 90% by weight. In the case of the electrophotographic elements illustrated in FIGS. 3 to 4, the percentage of the charge transfer material in the charge transfer medium layer 7 is, as in the case of the photosensitive layer of the electrophotographic element illustrated in FIG. 2, in the range of from 10 to 95% by weight, preferably from 30 to 90% by weight. In this connection, it is to be noted that when any electrophotographic element illustrated in FIGS. 1 to 4 is prepared, it is possible to use a plasticizer in conjunction with a binder.

In the case of the electrophotographic element according to this invention, as the electrically conductive support there can be employed a metallic plate or foil of aluminum or the like, a plastic film on which aluminum or the like is evaporation deposited a conductively treated paper or the like. As the binder suitably employed for this invention there may be enumerated condensation resins such as polyamide, polyurethane, polyester, epoxy resin, polyketone, polycarbonate, etc., vinyl polymers such as polyvinyl ketone, polystyrene, poly-N-vinylcarbazole, polyacrylamide, etc., and the like. However, it is to be noted that any insulating as well as adhesive resin may be employed. As the plasticizer for use in this invention there can be enumerated halogenated paraffin, polybiphenyl chloride, dimethylnaphthalene, dibutyl phthalate and so forth. The charge transfer material suitably employed in this invention includes high molecular compounds comprising vinyl polymers such as poly-N-vinylcarbazole, halogenated poly-N-vinylcarbazole, polyvinylpyrene, polyvinyl indroquinoxaline, polyvinyldibenzothiophene, polyvinyl anthracene, polyvinyl acridine and the like, condensation resins such as pyreneformaldehyde resin, bromopyrene-formaldehyde resin, ethylcarbazoleformaldehyde resin, chloroethylcarbazole-formaldehyde resin and the like, and low molecular materials (monomers) such as fluorenone, 2-nitro-9-fluorenone, 2,7-dinitro-9-fluorenone, 2,4,7-trinitro-9-fluorenone, 2,4,5,7-tetranitro-9-fluorenone, 4H-indeno[1,2-b]thiophene-4-one, 2-nitro-4H-indeno[1,2-b]thiophene-4-one, 2,6,8-trinitro-4H-indeno[1,2-b]thiophene-4-one, 8H-indeno[2,1-b]thiophene-8-one, 2-nitro-8H-indeno[2,1-b]thiophene-8-one, 2-bromo-6,8-dinitro-4H-indeno[1,2-b]thiophene, 6,8-dinitro-4H-indeno[1,2-b]thiophene, 2-nitrodibenzothiophenone, 2,8-dinitrodibenzothiophene, 3-nitrodibenzothiophene-5-oxide, 3,7-dinitrodibenzothiophene-5-oxide, 1,3,7-trinitro-dibenzothiophene-5,5-dioxide, 3-nitro-dibenzothiophene-5,5-dioxide, 3,7-dinitro-dibenzothiophene-5,5-dioxide, 4-dicyanomethylene-4H-indeno[1,2-b]thiophene, 6,8-dinitro-4-dicyanomethylene-4H-indeno[1,2-b]thiophene, 1,3,7,9-tetranitrobenzo[c]cinnoline-5-oxide, 2,4,10-trinitrobenzo[c]cinnoline-6-oxide, 2,4,8-trinitrobenzo[c]cinnoline-6-oxide, 2,4,8-trinitrothioxanthone, 2,4,7-trinitro-9,10-phenanthrenequinone, 1,4-naphthoquinonebenzo[a]anthracene-7,12-dione, 2,4,7-trinitro-9-dicyanomethylenefluorenone, tetrachlorophthalic anhydride, 1-bromopyrene, 1-methylpyrene, 1-ethylpyrene, 1-acetylpyrene, carbazole, N-ethylcarbazole, N-β-chloroethylcarbazole, N-β-hydroxyethylcarbazole, 2-phenylindole, 2-phenylnaphthalene, 2,5-bis(4-diethylaminophenyl)-1,3,4-oxadiazole, 2,5-bis(4-diethylaminophenyl)-1,3,4-triazole, 1-phenyl-3-(4-diethylaminostyryl)-5-(4-diethylaminophenyl)pyrazoline, 2-phenyl-4-(4-diethylaminophenyl)-5-phenyloxazole, triphenylamine, tris(4-diethylaminophenyl)methane, 3,6-bis(dibenzylamino)-9-ethylcarbazole, 9-ethylcarbazole-3-aldehyde, 1-methyl-1-phenylhydrazone and the like.

In this connection, it is to be noted that these charge transfer materials can be utilized singly or in an admixture of two or more materials.

Any one of the thus obtained electrophotographic elements can have an adhesive or barrier layer, if needed, interposed between the electrically conductive support and the photosensitive layer. The materials suitably available for said adhesive or barrier layer include polyamide, nitrocellulose, aluminum oxide, etc., and preferably the thickness of the film of said layer is 1 micron or less.

The copying process using the electrophotographic element of this invention comprises electrifying the surface of the element, exposing the same to light, thereafter developing and, if needed, transferring the thus formed image to another surface such as paper.

The element according to this invention is advantageous in that it is generally of a high sensitivity and rich in flexibility.

DESCRIPTION OF THE PREFERRED EMBODIMENTS

EXAMPLE 1

1 parts by weight of polyester resin (available from Du Pont Company under the trade name Polyester Adhesive 49000), 1 part by weight of disazo pigment No. 1 and 26 parts by weight of tetrahydrofuran were pulverized and mixed in a ball mill to thereby obtain a dispersion. The dispersion was coated onto an aluminum evaporation deposited polyester film by means of a doctor blade and dried at 100° C. for 10 minutes, whereby there was obtained an electrophotographic element of the type illustrated in FIG. 1 whose photosensitive layer was 7 microns thick.

Next, the photosensitive layer surface of this element was subjected to +6 KV corona discharge for 20 seconds by means of an electrostatic copying paper tester (SP 428 type available from KAWAGUCHI DENKI SEISAKUSHO K.K.) and charged positively. Thereafter, the positively charged element was allowed to stand in the dark for 20 seconds in order to measure the surface potential Vpo (volt) at that time, and then the photosensitive layer was exposed to light from a tungsten lamp so that the surface intensity was 20 lux. The time (in seconds) required until the surface potential was reduced to half of said Vpo was measured to determine the exposure amont $E_{\frac{1}{2}}$ (lux.sec). The obtained results showed: Vpo=720 V and $E_{\frac{1}{2}}$=10 lux.sec.

EXAMPLES 2 TO 10

The same preparation procedure as used in Example 1 was repeated with the exception that the disazo pigments numbered in the following Table-1 were employed in place of the disazo pigment No. 1 employed in Example 1 in the preparation of the electrophotographic elements. These elements were measured as in Example 1. The obtained results are as shown in Table-1.

TABLE 1

| Example No. | Disazo pigment No. | Vpo (volt) | $E_{\frac{1}{2}}$ (lux . sec) |
| --- | --- | --- | --- |
| 2 | 4 | 680 | 12 |
| 3 | 6 | 700 | 5 |
| 4 | 12 | 830 | 8 |
| 5 | 14 | 900 | 15 |
| 6 | 24 | 590 | 35 |
| 7 | 34 | 725 | 10 |
| 8 | 35 | 700 | 19 |
| 9 | 40 | 750 | 25 |
| 10 | 46 | 885 | 10 |

EXAMPLE 11

10 parts by weight of polyester resin (the same as employed in Example 1), 10 parts by weight of 2,4,7-trinitro-9-fluorenone having the formula

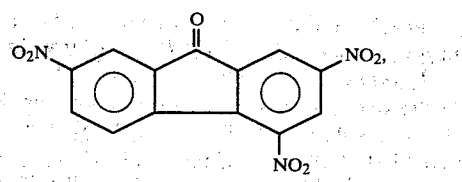

2 parts by weight of disazo pigment No. 1 and 198 parts by weight of tetrahydrofuran were pulverized and mixed in a ball mill to obtain a dispersion. The dispersion was coated onto an aluminum evaporation deposited polyester film by means of a doctor blade and dried at 100° C. for 10 minutes, whereby there was obtained an electrophotographic element of the type illustrated in FIG. 2 whose photosensitive layer was 10 microns thick. Next, this element was measured in respect of its Vpo and $E_{\frac{1}{2}}$ in accordance with the same procedure as used in Example 1 with the exception that −6 KV corona discharge was effected in place of +6 KV corona discharge.

The thus obtained results showed: Vpo=480 volt and $E_{\frac{1}{2}}$=15 lux.sec.

EXAMPLES 12 TO 20

Electrophotographic elements of the type illustrated in FIG. 2 were prepared by repeating the same procedure as used in Example 11 with the exception that the disazo pigments numbered in the following Table-2 were employed in place of the disazo pigment No. 1 employed in Example 11. The thus prepared electrophotographic elements were measured in respect of Vpo and $E_{\frac{1}{2}}$ in accordance with the same procedure as used in Example 11. The obtained results are as shown in Table-2.

TABLE 2

| Example No. | Disazo pigment No. | Vpo (volt) | $E_{\frac{1}{2}}$ (lux . sec) |
| --- | --- | --- | --- |
| 12 | 3 | 490 | 10 |
| 13 | 5 | 500 | 15 |
| 14 | 11 | 530 | 25 |
| 15 | 23 | 495 | 15 |
| 16 | 25 | 520 | 15 |
| 17 | 35 | 450 | 20 |
| 18 | 38 | 480 | 20 |
| 19 | 41 | 600 | 25 |
| 20 | 45 | 750 | 20 |

EXAMPLE 21

10 parts by weight of polyester resin (the same as employed in Example 1), 10 parts by weight of 2,5-bis(4-diethylaminophenyl)-1,3,4-oxadiazole having the formula

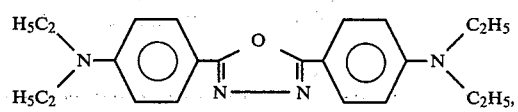

2 parts by weight of disazo pigment No. 1 and 198 parts by weight of tetrahydrofuran were pulverized and mixed in a ball mill to thereby obtain a dispersion. The thus obtained dispersion was coated onto an aluminum evaporation deposited polyester film by means of a doctor blade and dried at 120° C. for 10 minutes, whereby there was obtained an electrophotographic element of the type illustrated in FIG. 2 whose photosensitive layer was 10 microns thick. This element was measured in accordance with the same procedure as Example 1. The obtained results showed: Vpo=990 volt and $E_{\frac{1}{2}}$=12 lux.sec.

EXAMPLES 22 TO 30

Electrophotographic elements of the type illustrated in FIG. 2 were prepared by repeating the same procedure as Example 21 with the exception that the disazo pigments enumerated in the following Table-3 were employed in place of the disazo pigment No. 1 employed in Example 21. The thus obtained electrophotographic elements were measured in accordance with the same procedure as Example 1. The obtained results are as shown in Table-3.

TABLE 3

| Example No. | Disazo pigment No. | Vpo (volt) | E½ (lux . sec) |
|---|---|---|---|
| 22 | 2 | 900 | 13 |
| 23 | 9 | 900 | 19 |
| 24 | 13 | 870 | 15 |
| 25 | 28 | 800 | 15 |
| 26 | 33 | 880 | 9 |
| 27 | 45 | 890 | 10 |
| 28 | 44 | 900 | 17 |
| 29 | 36 | 950 | 20 |
| 30 | 8 | 950 | 15 |

EXAMPLE 31

200 parts by weight of poly-N-vinylcarbazole, 33 parts by weight of 2,4,7-trinitro-9-fluorenone, 20 parts by weight of polyester resin (the same as employed in Example 1) and 20 parts by weight of disazo pigment No. 1 were added to 1780 parts by weight of tetrahydrofuran. The resulting mixture was pulverized and mixed in a ball mill to thereby obtain a dispersion. The dispersion was coated onto an aluminum evaporation deposited polyester film by means of a doctor blade. The same was dried at 100° C. for 10 minutes and successively dried at 120° C. for 5 minutes, whereby there was obtained an electrophotographic element of the type illustrated in FIG. 2 whose photosensitive layer was 13 microns thick. This element was measured in accordance with the same procedure as Example 1. The obtained results showed: Vpo=1045 volt and E½=5 lux.sec.

EXAMPLES 32 TO 40

Electrophotographic elements of the type illustrated in FIG. 2 were prepared by the same procedure as Example 31 with the exception that the disazo pigment No. 1 was replaced by the respective disazo pigments enumerated in the following Table-4. The thus obtained electrophotographic elements were measured in respect to Vpo and E½ in accordance with the same procedure as Example 1. The obtained results are as shown in Table-4.

TABLE 4

| Example No. | Disazo pigment No. | Vpo (volt) | E½ (lux . sec) |
|---|---|---|---|
| 32 | 9 | 1100 | 7 |
| 33 | 10 | 1150 | 6 |
| 34 | 17 | 1100 | 7 |
| 35 | 29 | 1050 | 8 |
| 36 | 40 | 1060 | 8 |
| 37 | 42 | 1030 | 10 |
| 38 | 46 | 995 | 8 |
| 39 | 15 | 1520 | 10 |
| 40 | 20 | 1300 | 9 |

EXAMPLE 41

2 parts by weight of disazo pigment No. 1 and 98 parts by weight of tetrahydrofuran were pulverized and mixed in a ball mill to thereby obtain a dispersion. The obtained dispersion was coated onto an aluminum evaporation deposited polyester film and was air-dried, thereby forming a 1 micron-thick charge generation layer. Then 2 parts by weight of 2,4,7-trinitro-9-fluorenone, 2 parts by weight of polycarbonate (Panlite L available from TEIJIN K. K.) and 46 parts by weight of tetrahydrofuran were mixed to thereby obtain a dispersion. The dispersion was coated onto said charge generation layer by means of a doctor blade and was dried at 100° C. for 10 minutes to thereby form a 10 micron-thick charge transfer medium layer. Thus, there was prepared an electrophotographic element of the type illustrated in FIG. 3. The element thus obtained was measured in respect of Vpo and E½ in accordance with the same procedure as Example 1. The obtained results showed: Vpo=900 volts and E½=10 lux.sec.

EXAMPLES 42 TO 50

The same procedure as Example 41 was repeated with the exception that the diasazo pigment employed therein was replaced by the respective disazo pigments enumerated in the following table-5, thereby preparing electrophotographic elements of the type illustrated in FIG. 3. These elements were measured in respect of Vpo and E½. The obtained results are as shown in Table-5.

TABLE 5

| Example No. | Disazo pigment No. | Vpo (volt) | E½ (lux . sec) |
|---|---|---|---|
| 42 | 8 | 830 | 8 |
| 43 | 15 | 880 | 8 |
| 44 | 21 | 850 | 5 |
| 45 | 30 | 850 | 10 |
| 46 | 33 | 900 | 10 |
| 47 | 43 | 925 | 8 |
| 48 | 18 | 835 | 8 |
| 49 | 25 | 880 | 8 |
| 50 | 33 | 1100 | 13 |

EXAMPLE 51

2 parts by weight of disazo pigment No. 1 and 98 parts by weight of tetrahydrofuran were pulverized and mixed in a ball mill. The resulting dispersion was coated onto an aluminum evaporation coated polyester film by means of a doctor blade and air-dried to thereby form a 1 micron-thick charge generation layer. Then 2 parts by weight of 9-(4-diethylaminostyryl)anthracene having the formula

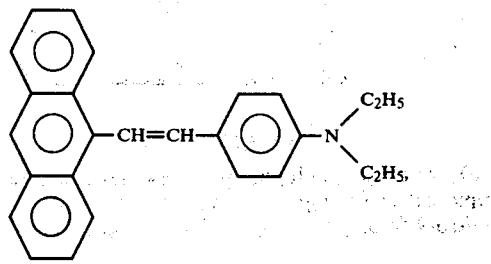

2 parts by weight of polycarbonate (the same as employed in Example 41) and 46 parts by weight of tetrahydrofuran were mixed and dissolved. The resulting solution was coated onto said charge generation layer by means of a doctor blade and dried at 120° C. for 10 minutes to thereby form a charge transfer medium layer having a thickness of 10 microns. Thus, there was obtained a layered electrophotographic element of the type illustrated in FIG. 3. The element was measured in accordance with the same procedure as Example 1 with the exception that said element was subjected to −6 KV corona discharge. The obtained results showed that Vpo=1100 volt and $E_{\frac{1}{2}}$=10 lux-sec.

EXAMPLES 52 TO 60

Similar electrophotographic elements were prepared in accordance with the same procedure as Example 51 with the exception that the disazo pigment No. 1 was replaced by those enumerated in the following Table-6. These elements were measured in respect of Vpo and $E_{\frac{1}{2}}$ respectively. The obtained results are as shown in Table-6.

TABLE 6

| Example No. | Disazo pigment No. | Vpo (volt) | $E_{\frac{1}{2}}$ (lux . sec) |
| --- | --- | --- | --- |
| 52 | 6 | 1000 | 8 |
| 53 | 14 | 950 | 8 |
| 54 | 39 | 980 | 7 |
| 55 | 22 | 990 | 8 |
| 56 | 27 | 990 | 5 |
| 57 | 35 | 1020 | 8 |
| 58 | 46 | 990 | 10 |
| 59 | 29 | 1000 | 3 |
| 60 | 31 | 1100 | 5 |

EXAMPLES 61 TO 72

76 parts by weight of pigment, 1260 parts by weight of a 2% tetrahydrofuran solution of polyester resin (Vilon 200; available from TOYO BOSEKI K.K.) and 3700 parts by weight of tetrahydrofuran were pulverized and mixed well in a ball mill. The resulting dispersion was coated onto an aluminum evaporation deposited polyester film by means of a doctor blade while leaving a wet gap of 35 μm, and the same was air-dried to thereby form a charge generation layer having a thickness of about 1 μm. Then, a solution comprising 10 parts by weight of a charge transfer material as shown in the following Table-7, 10 parts by weight of polycarbonate resin (Panlite K-1300; available from TEIJIN KASEI K.K.) and 80 parts by weight of tetrahydrofuran were coated onto said charge generation layer by means of a doctor blade while leaving a wet gap of 200 μm. The same was first dried at 80° C. for 2 minutes and then at 100° C. for 5 minutes to thereby form a charge transfer layer having a thickness of about 20 μm.

Then, the thus obtained electrophotographic elements were measured in accordance with the same procedure as Example 51 with the exception that the time (seconds) required until the surface potential was reduced to 1/10, the exposure amount E1/10 (lux·sec), was additionally measured. The obtained results are shown in Table-7.

TABLE 7

| Example No. | Disazo pigment No. | Charge transfer material | Vpo (v) | $E_{\frac{1}{2}}$ (lux . sec) | E1/10 (lux . sec) |
| --- | --- | --- | --- | --- | --- |
| 61 | 1 | A | 1242 | 14.7 | 64.2 |
| 62 | | B | 20 | 9.9 | 23.1 |
| 63 | | C | 680 | 4.1 | 10.9 |
| 64 | 35 | A | 1203 | 2.9 | 7.4 |
| 65 | | B | 15 | 8.3 | 14.2 |
| 66 | | C | 631 | 2.3 | 6.2 |
| 67 | 39 | A | 1437 | 2.6 | 7.3 |
| 68 | | B | 13 | 5.9 | 11.0 |

TABLE 7-continued

| Example No. | Disazo pigment No. | Charge transfer material | Vpo (v) | $E_{\frac{1}{2}}$ (lux . sec) | E1/10 (lux . sec) |
| --- | --- | --- | --- | --- | --- |
| 69 | | C | 1196 | 2.4 | 6.6 |
| 70 | 46 | A | 940 | 6.0 | 41.5 |
| 71 | | B | 11 | 1.9 | 3.4 |
| 72 | | C | 936 | 2.1 | 5.4 |

Note:
charge transfer material A ... 1,1-bis(4-dibenzylaminophenyl)propane having the formula

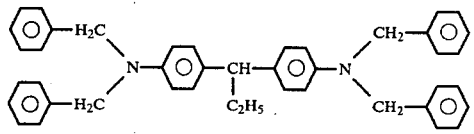

charge transfer material B ... 1-phenyl-3-(4-diethylaminostyryl)-5-(4-diethylaminophenyl)pyrazoline having the formula

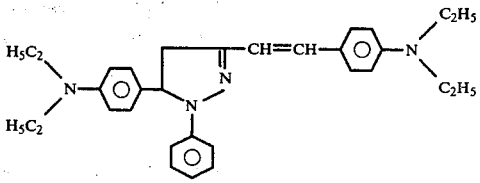

charge transfer material C ... 9-ethylcarbazole-3-aldehyde-1-methyl-1-phenylhydrazone having the formula

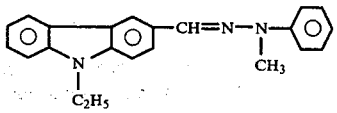

What is claimed is:

1. An electrophotographic element comprising; an electrically conductive support and a photosensitive layer superposed thereon, said photosensitive layer consisting essentially of a disazo pigment having the formula

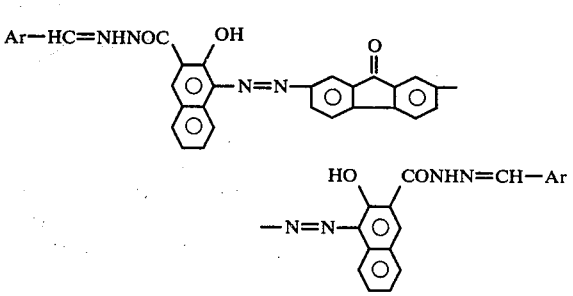

wherein Ar is substituted or non-substituted phenyl, substituted or non-substituted naphthyl, anthryl, pyrenyl, pyridyl, thienyl, furyl or carbazolyl, and a resinous binder.

2. An electrophotographic element as claimed in claim 1, wherein the particle diameter of said disazo pigment is about 5 microns or less, the thickness of said photosensitive layer is in the range of from about 3 to 50 microns, and the quantity of the disazo pigment is in the range of from about 30 to 70% by weight relative to the photosensitive layer.

3. An electrophotographic element as claimed in claim 1, wherein the disazo pigment is selected from the group consisting of:

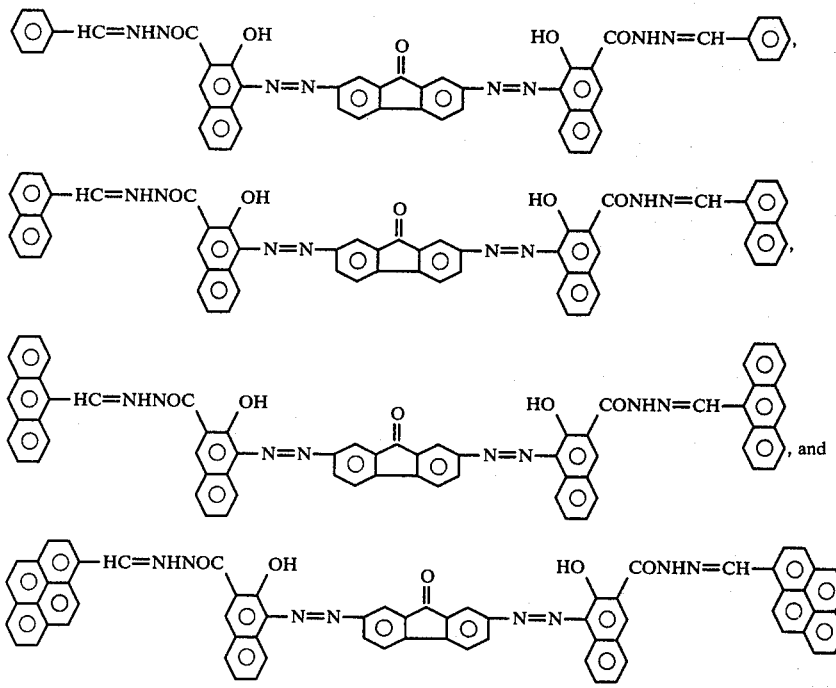

4. An electrophotographic element comprising an electrically conductive support and a photosensitive layer superposed thereon, said photosensitive layer consisting essentially of a disazo pigment having the formula

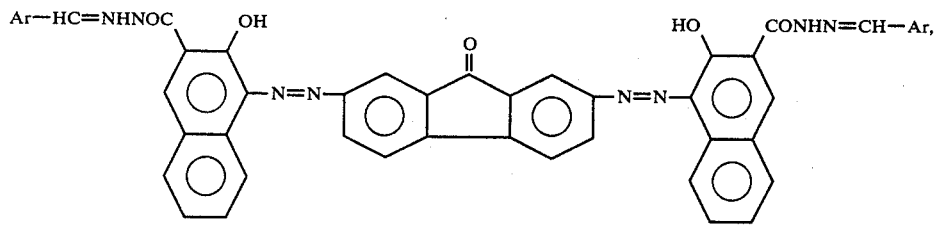

wherein Ar is substituted or non-substituted phenyl, substituted or non-substituted naphthyl, anthryl, pyrenyl, pyridyl, thienyl, furyl or carbazolyl, a charge transfer material and a resinous binder.

5. An electrophotographic element as claimed in claim 4, wherein the particle diameter of said disazo pigment is about 5 microns or less, the thickness of said photosensitive layer is in the range of from about 3 to 50 microns and the quantities of the disazo pigment and the charge transfer material are in the range of from about 0.1 to 50% by weight and in the range of from about 10 to 95% by weight relative to the photosensitive layer respectively.

6. An electrophotographic element as claimed in claim 4, wherein the disazo pigment is selected from the group consisting of

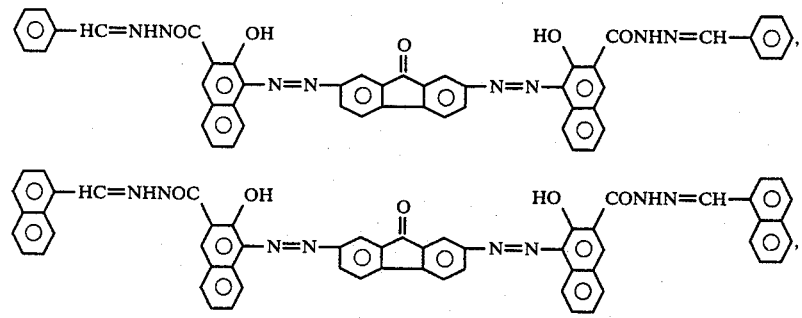

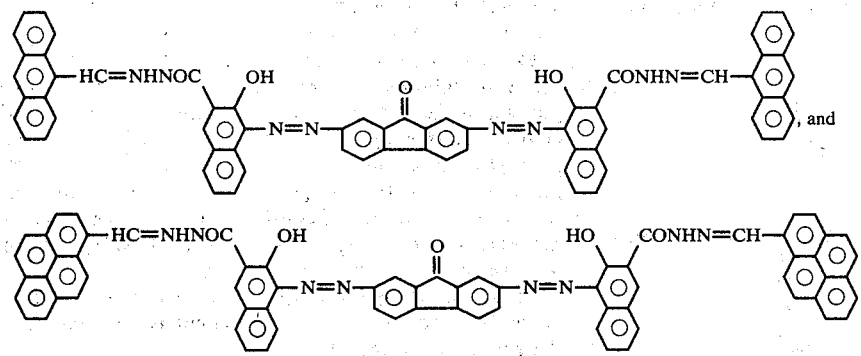
, and

7. An electrophotographic element comprising, in successive layers, an electrically conductive support; a charge generation layer consisting essentially of a disazo pigment having the formula

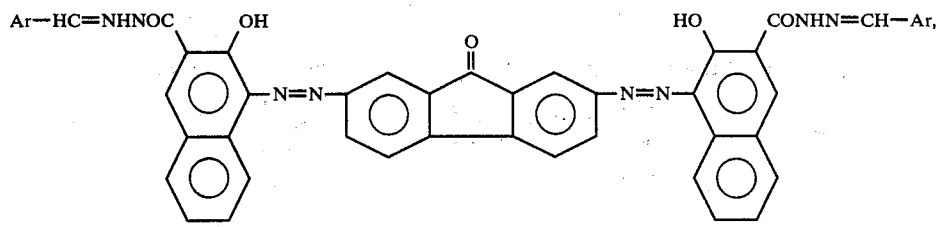

wherein Ar is substituted or non-substituted phenyl, substituted or non-substituted naphthyl, anthryl, pyrenyl, pyridyl, thienyl, furyl or carbazolyl; and a charge transfer layer consisting essentially of a charge transfer material and a resinous binder.

8. An electrophotographic element as claimed in claim 7, wherein the particle diameter of said disazo pigment is about 5 microns or less, the thickness of said charge generation layer and the thickness of said charge transfer layer are in the range of from about 0.01 to 5 microns and in the range of from 3 to 50 microns respectively and the quantity of the charge transfer material contained in the charge transfer layer is in the range of from about 10 to 95% by weight relative to the charge transfer layer.

9. An electrophotographic element as claimed in claim 7, wherein the disazo pigment is selected from the group consisting of

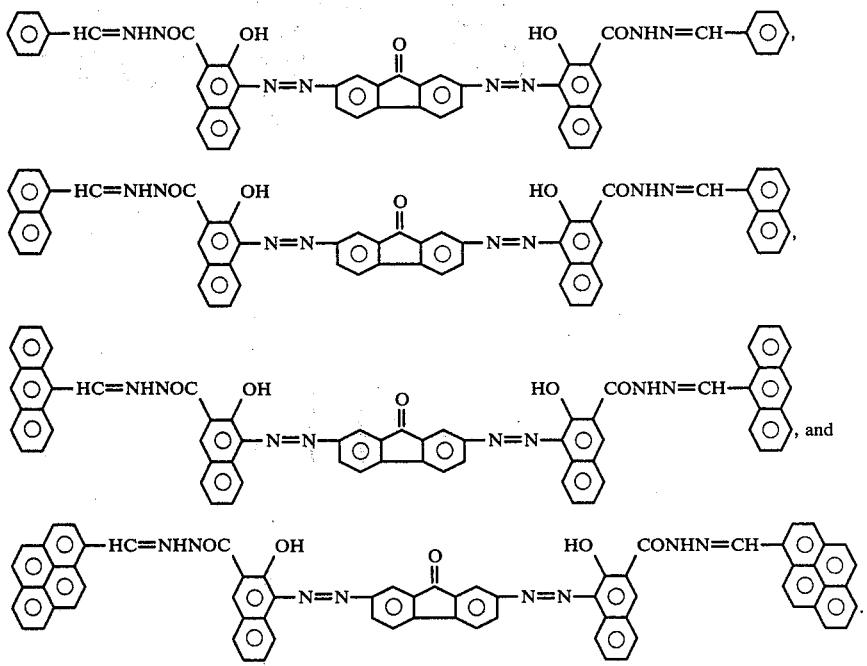

10. An electrophotographic element comprising, in successive layers, an electrically conductive support; a charge transfer layer consisting essentially of a charge transfer material and a resinous binder; and a charge generation layer consisting essentially of a disazo pigment having the formula

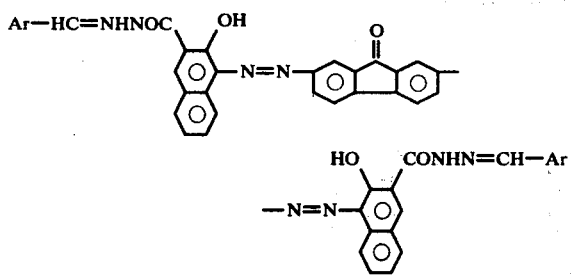

wherein Ar is substituted or non-substituted phenyl, substituted or non-substituted naphthyl, anthryl, pyrenyl, pyridyl, thienyl, furyl or carbazolyl.

11. An electrophotographic element as claimed in claim 10, wherein the particle diameter of said disazo pigment is about 5 microns or less, the thickness of said charge transfer layer and the thickness of said charge generation layer are in the range of from about 3 to 50 microns and in the range of from 0.01 to 5 microns respectively and the quantity of the charge transfer material is in the range of from 10 to 95% by weight relative to the charge transfer layer.

12. An electrophotographic element as claimed in claim 10, wherein the disazo pigment is selected from the group consisting of

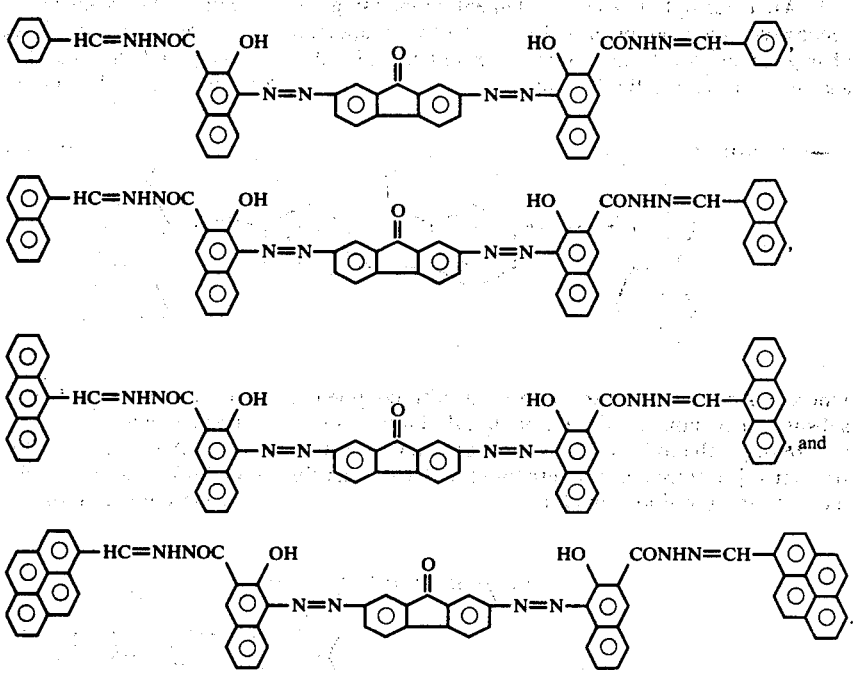

* * * * *